United States Patent [19]

Staab et al.

[11] 4,283,064
[45] Aug. 11, 1981

[54] ROTARY SHAFT SEAL

[75] Inventors: Thomas E. Staab, Hinsdale; Joseph Antonini, Chicago, both of Ill.

[73] Assignee: Dana Corporation, Toledo, Ohio

[21] Appl. No.: 853,166

[22] Filed: Nov. 21, 1977

Related U.S. Application Data

[63] Continuation of Ser. No. 716,501, Aug. 23, 1976, abandoned.

[51] Int. Cl.³ .............................................. F16J 15/32
[52] U.S. Cl. .................................. 277/81 R; 277/134; 277/152
[58] Field of Search ............... 277/81 R, DIG. 6, 184, 277/212 R, 133, 134, 152, 153

[56] References Cited

U.S. PATENT DOCUMENTS

| 3,426,819 | 2/1976 | Smith | 277/DIG. 6 |
|---|---|---|---|
| 3,549,445 | 10/1964 | McMahon | 277/184 |
| 3,574,351 | 4/1971 | Stoltman | 277/212 |
| 3,801,114 | 4/1974 | Bentley | 277/134 |
| 3,962,776 | 6/1976 | Mikami | 277/134 |

FOREIGN PATENT DOCUMENTS

| 524378 | 10/1962 | Belgium | 277/185 |
|---|---|---|---|
| 1339675 | 8/1963 | France | 277/134 |

*Primary Examiner*—Robert I. Smith
*Attorney, Agent, or Firm*—Robert M. Leonardi

[57] ABSTRACT

A hydrodynamic shaft seal is provided having a single annular shaft engaging washer clamped within a metal case. The washer, prior to assembly on the shaft, has an inner wall which is perpendicular to the flat walls thereof but spaced from the longitudinal axis of the washer by a distance which increases and decreases in a cyclic radially undulating fashion. Thus, the inner diameter of the unstressed annular member is scalloped and includes from one to approximately sixteen periodic scallops, the number of such scallops preferably increasing as the diameter of the seal increases. Such a seal is particularly easy to make and the varying angle of contact of the seal with the shaft occasioned by the scallops provides excellent hydrodynamic pumping as is desirable in such seals.

11 Claims, 3 Drawing Figures

ROTARY SHAFT SEAL

This is a continuation of application Ser. No. 716,501, filed on Aug. 23, 1976, and now abandoned.

BACKGROUND OF THE INVENTION

This invention relates to shaft seals and particularly to such seals having hydrodynamic characteristics.

Many types of shaft seals are known in the prior art and many such seals include ribs or ridges angularly displaced so as to provide a pumping action to return errant fluid, which may have passed the seal because of imperfections in the shaft, to the fluid side of the seal. Most such prior art devices have a resilient sealing portion which is formed by molding. Molding is a comparatively expensive operation and not well suited to certain otherwise desirable materials paticularly polytetrafluoroethylene.

It has also been proposed to form hydrodynamic shaft seals utilizing a plurality of differently formed "washers" of materials such as polytetrafluoroethylene, the washers being stacked axially along the shaft and each of the washers performing a separate function to provide an overall seal. An example of such a seal is found in U.S. Pat. No. 3,801,114. While being somewhat more amenable to construction with materials such as polytetrafluoroethylene than the prior art molded seals such a seal is nevertheless relatively complicated.

It is an object of the present invention to provide a seal which can be readily made from materials such as polytetrafluoroethylene.

It is another object of this invention to provide such a seal which utilizes a minimum number of parts and is therefore simple and inexpensive to manufacture.

It is a further object of this invention to provide such a seal having excellent hydrodynamic pumping characteristics.

SUMMARY OF THE INVENTION

The above and other objects are provided by the seal of the present invention which includes an annular housing of metal or the like which clampingly engages and supports a single annular sealing member of polytetrafluoroethylene or the like. The sealing member, prior to its insertion on the shaft, is planar and includes an interior wall which is at right angles to the plane of the seal. The interior wall, when viewed perpendicular to the plane of the unstressed sealing member, is scalloped. When placed on the shaft, the seal, and more particularly the sealing member thereof, engages the shaft in a correspondingly scalloped manner; i.e., at greater and lesser axial positions from a base line such positions being determined by the relative dimensions of the shaft and seal and by the magnitude of the scallops on the unstressed seal member. The seal engages the shaft at one edge of the sealing member, i.e., at the intersection of one flat face thereof and the scalloped interior each part of which is normal to the adjacent portion of the flat face. The scalloped face is oriented in the direction so as to force the fluid against which it is sealing and it is at a varying angle with respect to the shaft providing thereby a scraping effect which provides a very efficient hydrodynamic pumping action.

DESCRIPTION OF THE PREFERRED EMBODIMENTS

Figure 2:
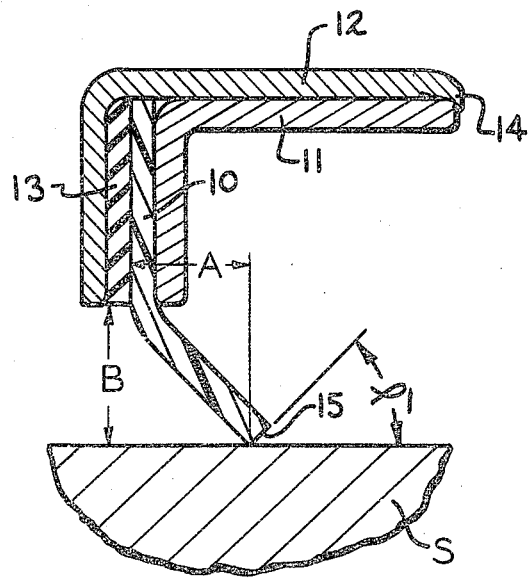
FIG. 2 is a cross-sectional view of the seal and shaft taken in the direction of the arrows 2—2 of FIG. 1 and showing the in use configuration of that portion of the sealing member at the maximum diameter thereof.
Figure 3:
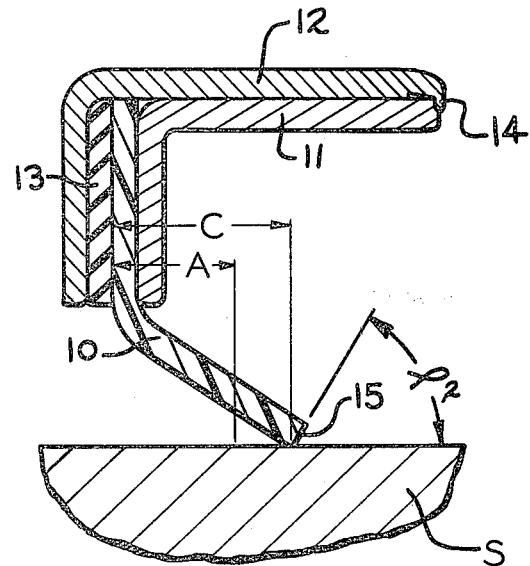
FIG. 3 is a cross-sectional view taken in the direction of the arrows 3—3 in FIG. 1 and showing the in use configuration of that portion of the sealing member having the minimum diameter.

FIGS. 2 and 3 show the seal of the present invention in its in use position on Shaft S. The seal comprises a housing of relatively rigid material such as metals which clampingly engages the seal member 10. The housing can and preferably does include an inner "L"-shaped member 11 and an outer "L"-shaped member 12 between which are sandwiched the seal member 10. An annular elastomeric resilient material in the form of washer 13 is preferably provided in face-to-face contact with the seal member 10 compressed between the halves of the casing to provide limited yieldability and thereby enhance the integrity of the clamped joint. The seal is formed by inserting the elastomeric ring 13 and sealing member 10 followed by the inner "L"-shaped member 11 within the outer "L"-shaped member 12 and then deforming the outer "L"-shaped member inwardly at 14 to secure the structure together. The seal 10 is preferably made of polytetraflouroethylene although other plastic or rubber materials suitable to the particular application such as Neoprene can be used.

Figure 1:
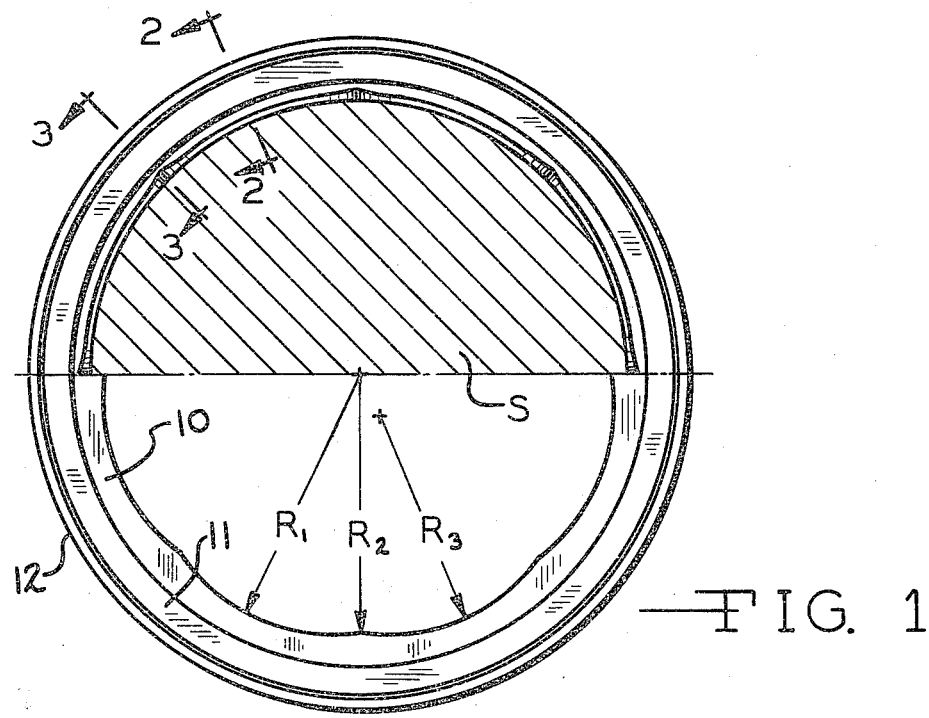
FIG. 1 is a plan view of a preferred embodiment of the invention showing, in the top half thereof, the seal as it appears in use on a shaft and, on the bottom half thereof the seal as it appears in its initial unstressed condition.

The sealing member 10 is shown in its unstressed condition in the lower half of FIG. 1. As will be seen the inner wall (15 in FIGS. 2 and 3) of the sealing member 10 is perpendicular to the axially spaced flat faces thereof and is scalloped when viewed perpendicular to the plane of the sealing member, i.e., as seen in FIG. 1. The scalloping is such that the unstressed sealing member has an opening with a maximum radius $R_1$ and a minimum radius $R_2$. The radius increases in a generally uniform fashion from a minimum $R_2$ to a maximum $R_1$ several times in progressing around the seal. The number of "cycles" (i.e., the number of times the radius progresses from a minimum to a maximum and back to a minimum) preferably increases as the overall seal size increases. Preferably there are about one to two cycles per inch of seal diameter. In a seal of very small diameter, for instance one inch (2.54 cm.), a single or double cycle could successfully be used. For larger seals up to approximately six inches (15.25 cm.) between about six and about twelve cycles are preferably used.

A variety of scalloped geometries can be used. In one preferred embodiment, not illustrated, the scallops are sinusodial; i.e., the radius is defined by the equation $R = R_o + K \sin(N\theta)$ where $R_o$ is the average radius, K is a constant related to the amplitude of the excursions from the average radius, N is the number of scallops or "cycles" around the seal lip and $\theta$ is the angular position around the seal from an arbitrary zero point.

In another preferred embodiment and as illustrated, the scallops can be generated as circular arcs having a center located between the center of the seal and the sealing portion thereof with a radius $R_3$ less than the average radius of the seal and preferably in the range of 75%–90% the such average diameter.

As will be appreciated the amplitude of the radial excursions of the seal lip and the average diameter of the seal lip relative to the diameter of the shaft will both affect the in-use angles between the interior face 15 of the seal member and the shaft S. Preferably this angle increases from a minimum $\alpha_1$, shown in FIG. 2 and associated with the maximum interior diameter of the seal member 10, of between 45 and 80 degrees and a maximum angle $\alpha_2$, shown in FIG. 3 and associated with a minimum interior diameter of the seal member 10, of a maximum of 90 degrees.

The seal member 10 is displaced axially by a minimum distance A which is preferably at least equal to the radial clearance B between the radially innermost portion of the casing members and the shaft. In addition, the magnitude of the amplitude of the scallops will be such that the axial position of the sealing edge between its minimum displacement A and maximum displacement C (see FIG. 3) will be between about 0.030 and 0.120 inches.

It has been found in a seal according to the present invention that it is very simple to construct and provides a very efficient hydrodynamic pumping action. The foregoing description of the preferred embodiments is considered illustrative and not limiting. Many inventions within the spirit and scope of the following claims will occure to those skilled in the art.

What is claimed is:

1. A hydrodynamic shaft seal comprising an annular casing having an axis and a sealing element, said casing engaging the radially outer edge of the sealing element, the sealing element comprising an annular disc of elastomeric material, said disc comprising two faces and a generally annular inner surface extending between and forming edges with said faces, at least one of said edges being radially displaced from said casing axis by varying distances when said sealing element is unstressed, wherein said at least one of said edges is a circumferentially continuous radially innermost sealing edge of said seal when said seal is mounted on a shaft.

2. The seal of claim 1 wherein said sealing element comprises polytetrafluoroethylene.

3. The seal of claim 1 wherein said at least one of said edges is defined by a plurality of arcs having radii less than the average distance between said casing axis and said at least one of said edges and having centers located between said casing axis and the seal element.

4. The seal of claim 3 wherein said arcs have a radius of from about 75% to 90% of the distance between said casing axis and said at least one of said edges.

5. The seal of claim 3 wherein said sealing element comprises polytetrafluoroethylene.

6. The seal of claim 4 wherein said sealing element comprises polytetrafluoroethylene.

7. The seal of claim 1 wherein said sealing element consists essentially of a single disc.

8. A hydrodynamic shaft seal as defined in claim 1 wherein said two faces of said sealing element are substantially flat and parallel.

9. A hydrodynamic shaft seal as defined in claim 8 wherein said annular inner surface of said sealing element is substantially perpendicular to each of said two faces.

10. A shaft having a generally longitudinal axis and a hydrodynamic shaft seal mounted on said shaft, said seal comprising an annular casing and a sealing element, said casing engaging the radially outer edge of the sealing element, the sealing element comprising an annular disc of elastomeric material, said disc comprising two faces and a generally annular inner surface extending between and forming edges with said faces, at least one of said edges being radially displaced from said axis by varying distances when said seal is unstressed, wherein said at least one of said edges is in continuous circumferential sealing contact with said shaft.

11. In a hydrodynamic shaft seal adapted to be mounted on a shaft, said seal comprising an annular casing having an axis and a sealing element, said casing engaging the radially outer edge of said sealing element, said sealing element comprising an annular disc of elastomeric material, said disc comprising two faces and a generally annular inner surface extending between and forming edges with said faces, at least one of said edges adapted for continuous circumferential sealing contact with said shaft, the improvement wherein said at least one edge is radially displaced from said casing axis by varying distances when said seal is unstressed.

* * * * *